United States Patent

Palagonia

[15] 3,638,986
[45] Feb. 1, 1972

[54] COMBINATION PICK AND SHOVEL

[72] Inventor: Joseph R. Palagonia, 7229 67th St., Glendale, N.Y. 11227

[22] Filed: July 20, 1970

[21] Appl. No.: 56,322

[52] U.S. Cl.....................294/49, 294/55, 172/375, 294/51
[51] Int. Cl..........................A01b 1/00, A01d 9/00
[58] Field of Search..................294/49, 51, 55, 61, 2; 172/375, 378; 7/1, 14.1, 14.5

[56] References Cited

UNITED STATES PATENTS

| 846,824 | 3/1907 | Ceska | 294/49 |
| 1,305,079 | 5/1919 | Eaton | 294/49 |
| 3,226,149 | 12/1965 | McJohnson | 294/51 |
| 884,177 | 4/1908 | Lowry | 294/51 |
| 1,426,442 | 8/1922 | Adam | 294/49 |
| 3,095,228 | 6/1963 | Duppengiesser | 294/49 |
| 2,909,385 | 10/1959 | Meredich | 294/49 |
| 2,193,341 | 3/1940 | Mehringer | 294/51 |

Primary Examiner—Harvey C. Hornsby
Attorney—Allison C. Collard

[57] ABSTRACT

A pick, soil strainer, and shovel combination consisting of a pair of spaced-apart parallel channels which taper to a point at one end for penetration into the soil and which converge at their opposite end for securement to the handle of the tool. One of the channels includes a plurality of perforations which permits the soil to be sifted and strained. Connected to the lower end of the handle and extending between the channels is a soil pick which works in conjunction with the parallel channels.

4 Claims, 6 Drawing Figures

PATENTED FEB 1 1972
3,638,986
FIG.1
FIG.2
FIG.4
FIG.5
FIG.3
FIG.6
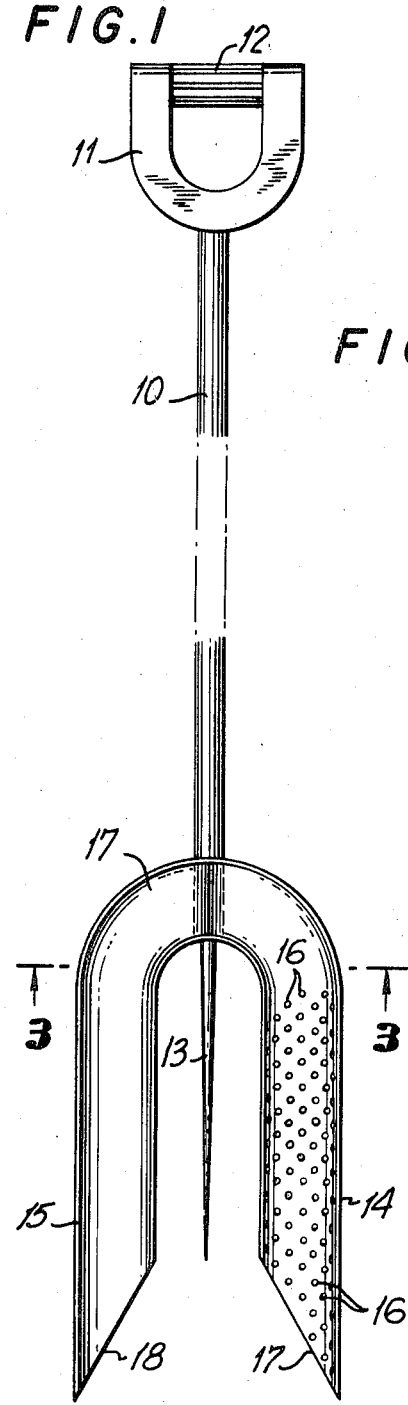
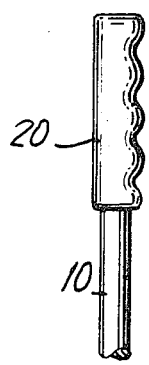
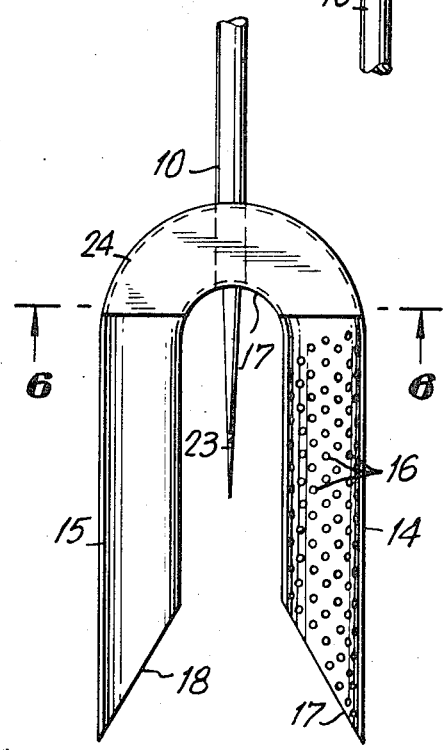
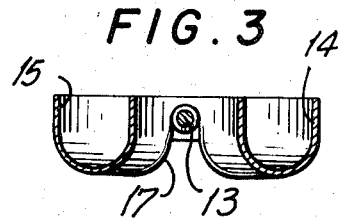
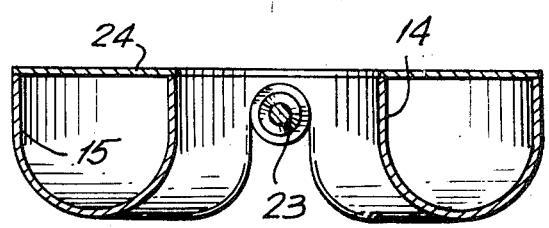
INVENTOR.
JOSEPH R. PALAGONIA
BY
ATTORNEY

COMBINATION PICK AND SHOVEL

This invention relates to a combination pick and shovel for use in turning over and breaking up soil.

More specifically, this invention relates to a gardening tool particularly adapted for turning over and breaking up soil, and also straining the soil when desired.

Spades, pitchforks, shovels and picks are among the most common of garden tools. A spade or pick is generally a sharp-pointed instrument having one or more prongs for breaking up clumps of top soil. A spade is used for turning the soil and includes a heavy, deep blade mounted on the end of a handle. Devices which are known for straining the soil generally consist of screens having a certain aperture opening for separating stones and other foreign objects from the soil. In certain applications, there is a need for the combined use of all three of these tools to perform a specific task. It is, thus, disadvantageous for the user to perform the desired task using three individual tools, wherein each of the tools has to be handled separately in order to do the job.

Accordingly, the present invention provides a combination shovel, pick, and soil straining device capable of performing three different operations almost simultaneously. The gardening tool of the present invention consists of a shovel or spadelike member having two parallel extending channels which terminate with points for piercing the soil surface. The other ends of the parallel channels converge upon the handle of the tool to form a soil receiving receptacle for storing the soil after it has been removed. Disposed between the parallel channels is a pick which is particularly useful for breaking up dense clumps of soil. Disposed along one of the channel members are a plurality of perforations or holes which serve as a straining device for separating rocks, stones and other foreign objects from the soil. The handle which is connected to the end of the tool, may include a U-shaped handgrip, or an indented finger grip as desired.

It is, therefore, an object according to the present invention to provide a combination shovel, pick and strainer in one tool.

It is another object according to the present invention to provide a gardening tool which is simple in design, easy to manufacture and reliable in operation.

Other objects and features of the present invention will become apparent from the following detailed description considered in connection with the accompanying drawing which discloses the embodiments of the invention. It is to be understood, however, that the drawing is designed for the purpose of illustration only and not as a definition of the limits of the invention.

In the drawing, wherein similar reference characters denote similar elements throughout the several views:

FIG. 1 is a plan view of one embodiment of the combination tool according to the invention;

FIG. 2 is a side-plan view of the tool of FIG. 1;

FIG. 3 is a cross-sectional view taken along section 3—3 of FIG. 1;

FIG. 4 is a detailed view of another type of handle for the tool of FIG. 1;

FIG. 5 discloses another embodiment of the combination tool according to the invention; and FIG. 6 is a cross-sectional view taken along section 6—6 of FIG. 5.

Referring to FIGS. 1-3, there is shown a first embodiment of the combination pick, shovel and strainer tool according to the invention, having an elongated cylindrical handle 10 which terminates at its top end in a U-shaped handgrip 11 which is closed by hand bar 12. At the other end of handle 10 are a pair of parallel, spaced-apart soil receiving channels 14 and 15 which are open on their top side and preferably have a U-shaped cross section. Channel 14 includes a tapered point 17 and channel 15 includes a correspondingly similar tapered point 18. Channels 14 and 15 are preferably integrally formed and converged to form a compartment 17. Secured through the center of compartment 17 is a polelike handle 10. Inserted into the lower end of handle 10 is a pick 13 which in this embodiment extends substantially along the length of channels 14 and 15. Channel 14 includes a plurality of apertures 16, wherein each aperture is preferably the diameter of a dime so as to form a strainer for sifting out stones and foreign particles from the soil. Apertures 14 are preferably disposed from the tapered point 17 of channel 14 along the straight portion of channel 14 before the channel converges into soil receiving area 17.

FIG. 4 shows another possible embodiment of the invention wherein a handgrip 20 is secured to the end of handle 10 instead of utilizing U-shaped handgrip 11 as shown in the embodiment of FIG. 1.

FIG. 5 discloses still another embodiment of the invention, wherein pick 23 is utilized and is considerably shorter in length than pick 13. The embodiment of FIG. 5, as shown in detail in FIG. 6, may also include a cover 24 secured to the circular rims of soil receiving area 17. Cover 24, which adds considerable support and strength to soil receiving area 17, preferably extends only to the straight portion of channels 14 and 15.

Channels 14 and 15 of soil receiving area 17 may be constructed of any rigid material, such as steel, aluminum and the like. Pick 13 may also be constructed of rigid strong materials such as steel. Handle 10 may be constructed of plastic or wood and hand receiving members 11 or 20 may be constructed from plastic, wood, metal and the like.

While only a few embodiments of the present invention have been shown and described, it will be obvious that many modifications and changes may be made thereunto without departing from the spirit and scope of the invention.

What is claimed is:

1. A combination garden tool, comprising:
  an elongated, U-shaped rigid channel member, having a U-shaped cross section and integrally formed tapered end portions terminating to a point on the end of said channel member, the curved portion of said channel member serving as a receptacle area for soil, and one of the linear portions thereof being provided with a plurality of apertures along its length for sifting unwanted stones and foreign particles from soil picked up by said channel member,
  a handle affixed to the curved portion of said rigid channel member, and
  a pick affixed to the lower end of said handle and disposed between the linear portions of said U-shaped channel member for breaking up dense clumps of soil in conjunction with said rigid channel member.

2. The combination garden tool as recited in claim 1, wherein said handle means additionally comprise a pole secured at one end to said receptacle area, a U-shaped handgrip secured to the other end of said pole, and a hand bar disposed across the opening of said handgrip.

3. The combination garden tool as recited in claim 1, wherein said handle means additionally comprise a pole secured at one end to said receptacle area, a finger grip secured to the other end of said pole.

4. The combination garden tool as recited in claim 1, wherein said receptacle area additionally comprises a cover secured over and enclosing the edges of said receptacle area.

* * * * *